Feb. 11, 1941.  A. G. DEAN  2,231,846
UNDERFRAME CONSTRUCTION
Original Filed April 27, 1937  5 Sheets-Sheet 1

INVENTOR.
ALBERT G. DEAN.
BY
ATTORNEY.

Feb. 11, 1941. A. G. DEAN 2,231,846
UNDERFRAME CONSTRUCTION
Original Filed April 27, 1937  5 Sheets-Sheet 2

INVENTOR
ALBERT G. DEAN.
BY
ATTORNEY.

Patented Feb. 11, 1941

2,231,846

UNITED STATES PATENT OFFICE 2,231,846

UNDERFRAME CONSTRUCTION

Albert G. Dean, Narberth, Pa., assignor to Edward G. Budd Manufacturing Company, Philadelphia, Pa., a corporation of Pennsylvania Application April 27, 1937, Serial No. 139,145
Renewed February 3, 1940

27 Claims. (Cl. 105—414)

This invention relates to improvements in vehicle bodies and more particularly to an underframe construction, especially adapted for rail cars. It is more particularly a continuation in part of my co-pending application, Serial No. 740,544, issued as Patent No. 2,185,977, Jan. 2, 1940, filed August 20, 1934, for Vehicle body construction and method of assembling the same, and is a continuation in part of a co-pending application, Serial No. 101,668, issued as Patent No. 2,171,425, Aug. 29, 1939, filed September 19, 1936, for Vehicle construction of which I am one of the joint inventors.

I have, heretofore, disclosed an improved form of vehicle body more especially for rail cars which is of a light weight, high strength type, the entire framework of which comprises a hollow truss with the roof and underframe members serving as chords and with the side frames adapted to serve as the struts. Such construction is more especially formed of separate sub-assembled units which are in turn preferably formed of rolled sections of high tensile material such as of "18—8" stainless steel welded into an integral unit.

The principal object of the present invention is to provide an improved underframe construction for a vehicle which is adapted to serve as the compression member of the hollow body truss, such underframe being primarily adapted to resist longitudinal loads due to body reactions as well as buffing loads, as distinguished from bending loads which are carried by other parts of the vehicle body.

Another object of the present invention is to provide a simplified underframe construction which may effectively be built as a sub-assembly unit and quickly attached to the side frames of the vehicle body with the joints fully accessible for welding.

Another object of the invention is to provide an improved underframe construction including a column form of center sill of especially light weight through which a plurality of improved floor beams extend with the entire center sill and floor beams made into an effective plate girder by the provision of integrally secured flooring.

These and other objects of the invention and the manner in which they are attained will become apparent from the following detailed description of preferred forms of embodiment of the invention when read in connection with the accompanying drawings forming a part thereof.

In one form of embodiment of the invention, the improved vehicle body includes a side frame A to which is attached a roof B and an underframe C, each of which can be preassembled on an especial assembly jig for initial sub-assembly into a unit with the parts entering into these structures readily accessible for attachment to each other. Such sub-assembly method is particularly desirable in speeding up production where large numbers of cars are being produced and where the time saving justifies the jig expense or where the body elements may be assembled at other points than the point of fabrication. The structures are therefore arranged to facilitate final assembly into a rigid body.

The side sub-assemblies A are the principal load supporting members and are of truss type having spaced vertical posts 10 which are of generally outwardly presenting channel form having the side walls flanged and organized into shear panels. They are connected at the top by a channel member 11 becoming a part of a top chord which is telescoped over the upper ends of the posts and secured thereto through its outer and inner walls. The posts are spaced longitudinally at varying distances to take care of various openings required in the side of the car and properly take the load stressed in the various longitudinal regions of the body.

At the belt line, the posts 10 are further interconnected by flanged channel section moulding strips 12 and 13 which extend throughout the length of the side unit sub-assembly except for the interruption at the door opening. At the lower portion, the posts are interconnected by continuous longitudinal moulding strips 14 and 15 serving as a lower chord and being similar to moulding strip 12 and similarly connected to the posts. These last named moulding strips are spaced a slight distance apart and the space between them is bridged by a connecting longitudinal strip of corrugated paneling 16.

To complete the truss structures of the side wall frames, the diagonal members 17 are of box section and adapted to take both compression and tension strains and extend from points adjacent the bottom of one post and extend to the top of an adjacent post. They are secured to the posts through the intermediary of generous gussets 18 spot welded to the posts and diagonal members both inside and outside of the side wall truss structure, thus avoiding eccentricity of loading in the truss structure.

Figures 1, 2:
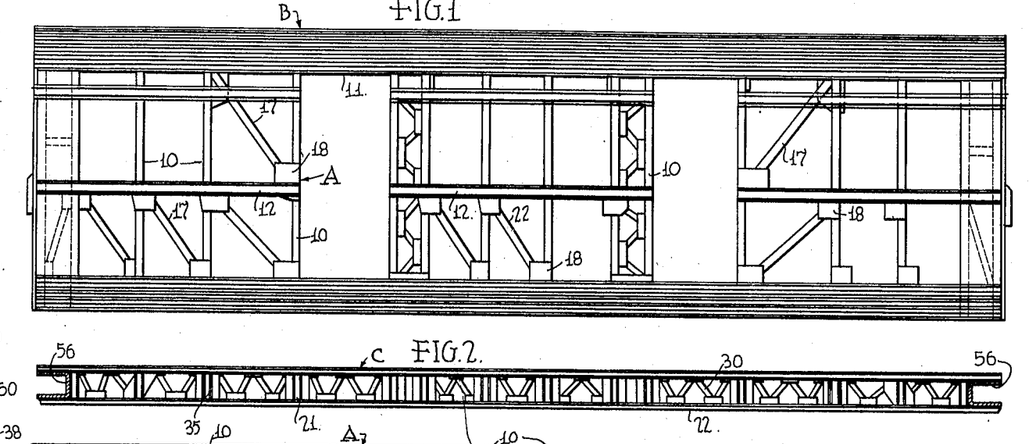
Fig. 1 is a side elevation of a vehicle body.
Fig. 2 is a side elevation of the underframe sub-assembly.
Figure 1A:
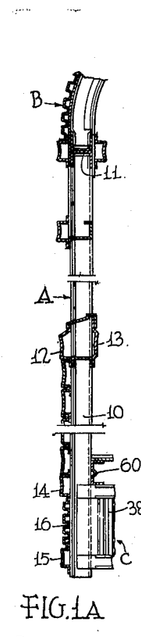
Fig. 1a is an enlarged vertical section through a wall of the body.
Figure 3:
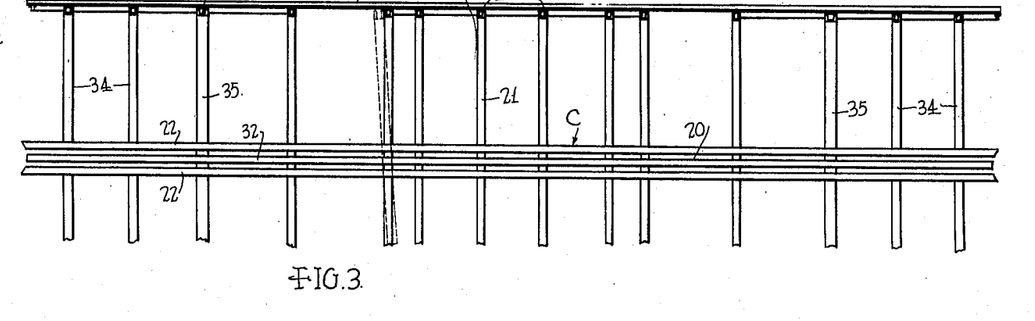
Fig. 3 is a diagrammatic view prior to final assembly of the relative positions of the side and underframe assemblies.
Figures 4, 5:
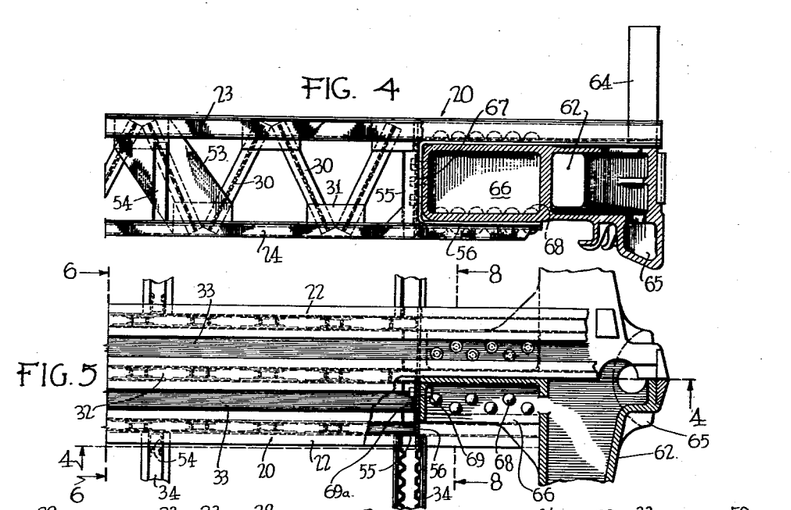
Fig. 4 is an enlarged vertical section taken on the line 4—4 of Fig. 5.
Fig. 5 is a fragmentary plan view on the same scale as Fig. 4 of the center and end sill assembly with parts broken away being shown in section.

The foundation of the underframe C, is the center sill structure 20, see Figs. 3 and 4. This center sill structure, in order to secure the desired lightness and have adequate strength to take the longitudinal buffing and draft shocks is suitably a built-up truss structure. This permits the ready threading through the center sill, without a break in the continuity of the chords of the truss structures, of the vertically deep floor beams 21, and of their location longitudinally in positions corresponding to the position of the posts 10 in the side frames.

The center sill structure preferably comprises two spaced vertically deep truss structures or beams 22, see Fig. 5, these structures being in the present instance, of the Warren truss type and each extending the full length of the underframe. Each of these trusses may comprise top chords 23, see Fig. 4, and bottom chords 24 each of channel shape having laterally extending flanges from their side walls, the channels presenting toward each other. The channels of the top chords, for ease of assembly, are built up structures consisting of two laterally facing channels 26 and 27 having their top side walls interconnected by a flat plate 28, all of said parts being strongly interconnected by spot welds in their overlapping edge portions, see Fig. 6.

The webbing connecting the chords 23 and 24 preferably consists of diagonal members 30 adapted to take both compression and tension loads, such members being preferably constructed by arranging two channels back to back and spot welding them together through their walls. The ends of these web members are telescoped between the side walls of the top and bottom chords and spot welded thereto. Where desired, for additional strength, as adjacent the ends of the sill structures, gussets 31 are spot welded to the side walls of the webbing and to the side walls of the channel section chords.

Adjacent the ends, the center sill structures are reinforced by a third vertically deep truss beam 32 arranged between the beams 22 and similarly constructed. The top chord 23 of this center beam may extend the whole length of the underframe, see Fig. 3, and serve in its intermediate portions mainly as a floor stringer. For further reinforcement, adjacent the ends, the webbing may be reinforced as by spacing the web members 30 more closely. For still further reinforcement of the ends of the sill structures, relatively heavy gauge, flat plates 33 are arranged in bridging relation to the laterally extending flanges of the top and bottom chords 23 and 24 between the adjacent beams and securely spot welded thereto.

The transverse floor beams 21 vary somewhat in their detailed construction depending upon their location in the structure. All of them, however, except the two adjacent each end, designated in Fig. 3 at 34, are of vertically deep section and extend through between the top and bottom chords of the center sill structure. Of these vertically deep floor beams, all except the two corresponding to the third from the end in Fig. 3 which may be termed needle beams, being designated at 35, which two are of extra heavy construction for a purpose which will be described hereinafter, are of a structure which will now be described, the two extra heavy beams being also of this structure except where otherwise specified.

Figure 7:
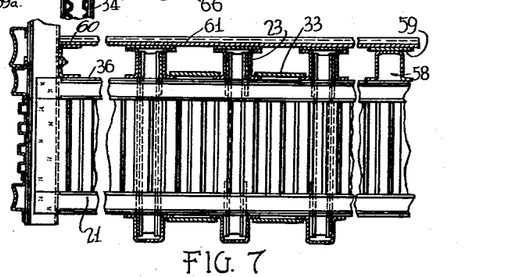
Fig. 7 is a transverse vertical section similar to Fig. 6 but showing the typical floor beam section where the floor beam passes through the center sill.
Figures 8, 9:
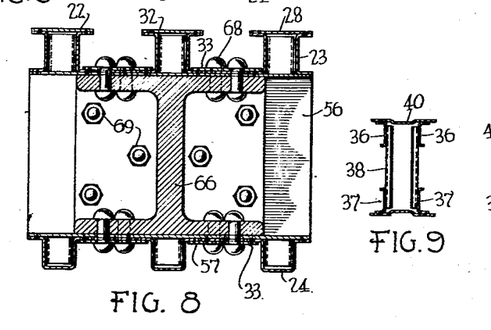
Fig. 8 is a detail transverse vertical section on an enlarged scale taken substantially on the line 8—8 of Fig. 5.
Figs. 9 and 10 are vertical sectional views through a typical floor beam construction and through the reinforced floor beam generally termed "the needle beam" as shown in Fig. 11.
Figure 10:
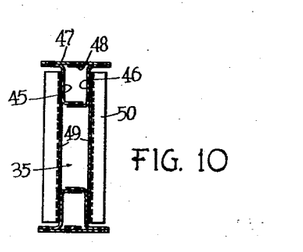
Figures 11, 12:
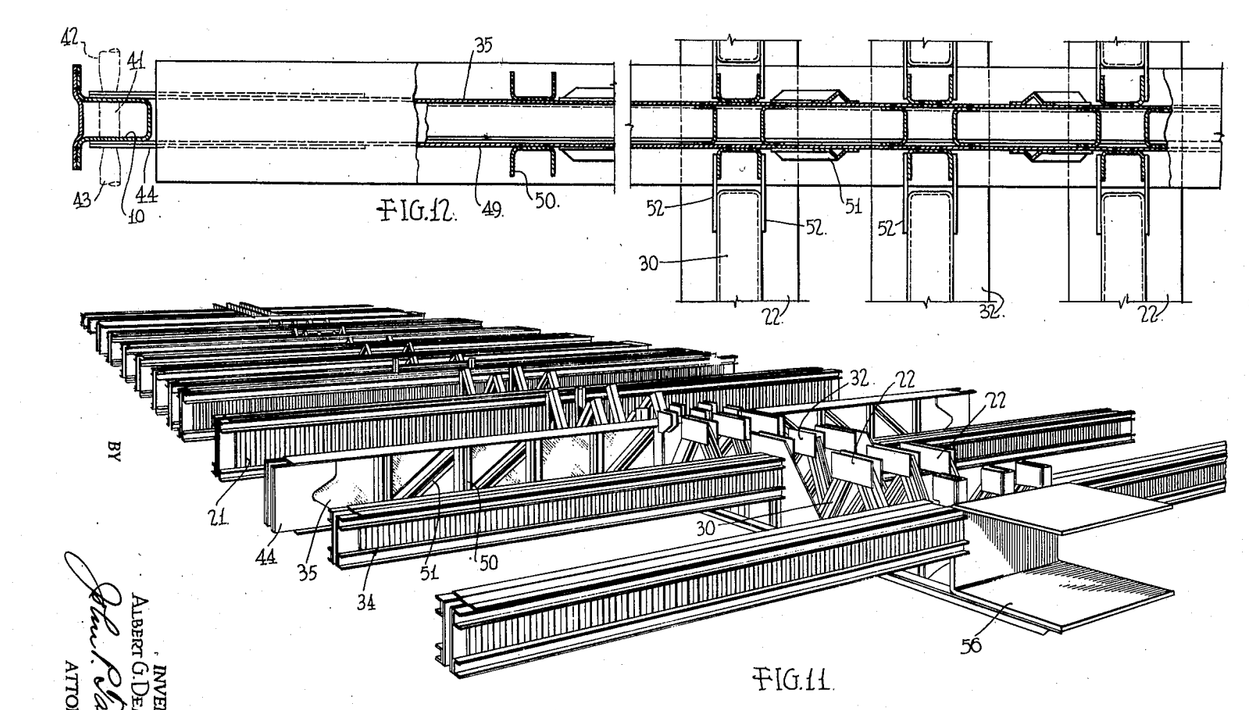
Fig. 11 is a perspective view of an underframe sub-assembly at one stage of the assembly operation.
Fig. 12 is a fragmentary detail plan view of the reinforced transverse floor or needle beam parts, being in section in part and broken away in part to show the manner of its connection to the side wall sub-assembly and to the center sill.
Figure 13:
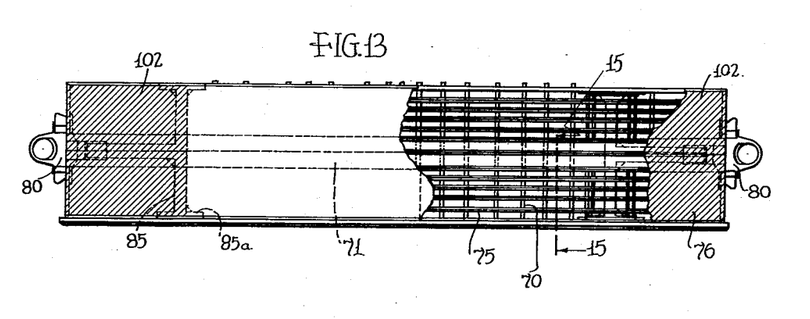
Fig. 13 is a plan view, with parts of the flooring broken away of a modified form of underframe.

The transverse sectional views shown in Figs. 9 and 10, the horizontal section shown in Fig. 12, and the elevational view shown in Fig. 7, clearly show this construction. Each of these beams comprises a hollow box section beam which consists in the typical form shown in Figs. 7, 9 and 12, of the top and bottom chords designated respectively 36 and 37, the adjacent side walls of which are interconnected by spaced vertical corrugated webbing 38. For ease of assembly of this webbing with the top and bottom chords, these chords are preferably constructed out of two laterally facing channels which are first connected to the webbing by welding through their bottom walls and are then interconnected to form the channel chords by cover plates 40 welded to the adjacent side walls of the channels.

To provide for their final assembly with the side sub-assemblies, the side walls of these box section floor beams are integrally extended by both the channels entering into the chord structures 36 and 37 and the webbing 38 beyond the top and bottom cover plates 40 entering into the construction of the chords 36 and 37. These extended ends of the webbing are flat and spaced apart to fit flatly against the opposite side walls of a post 10 as shown in Figs. 7 and 12, and, in the final assembly, the post is securely welded both to the extended ends of the webbing and to the extended ends of the channels 36 and 37 entering into the chord structure to form a strong final assembly joint structure avoiding the necessity of using the gussets. The joinder is further facilitated by this construction by reason of the fact that both sides of the joint may be simultaneously made by placing a copper anvil or core 41 between the side walls of the post and the overlapping end of the floor beam and then bringing the opposed electrodes 42 and 43 in engagement with the opposite sides of the joint and passing the welding current through both the overlapping thicknesses of the metal and the copper core or anvil as indicated in dotted lines in Fig. 12.

The heavy floor beams or needle beams 35, shown in Fig. 10, and in the perspective view of Fig. 11, are constructed also of box section and of relatively heavy gauge metal, the ends of the box section having their side walls extended in a manner similar to that of the typical beam already described, the ends of the side walls being, however, reinforced by plates 44, as shown in Figs. 11 and 12, and secured to the posts in a similar manner. As shown in the sectional view of Fig. 10, these beams are built up of deep box section top and bottom chords, each of said chords being built up out of two Z-section strips 45 and 46, welded together through their overlapped arms which extend toward each other, and a heavy gauge cover plate 47 welded to the outstanding arms of said Z-section strips for completing the box section. This heavy gauge cover plate may be additionally reinforced by a central strip 48 welded thereto. The deep side walls of these box section chords are connected by flat plate webs 49 securely spot welded thereto throughout their extensive overlapped area.

These beams which are especially designed to carry the buffer shocks and the eccentric loading upon the center sill into the side frame structures, are additionally reinforced on their outer faces by vertical channels 50 and diagonally extending channels 51, as shown in Fig. 11, arranged to minimize bending of the beam under the heavy loading to which it is subjected. These channels are spot welded to the web plates and at their ends also to the side walls of the channel section chords. The central portion of the needle beam 35 ties strongly into the center sill structure by having the vertical channels 50 arranged in the planes of the sill beams 22 and 32 and forming web members connecting the top and bottom chords of said beams, see Fig. 12. Additional reinforcement is obtained by connecting these vertical web members 50 with the adajcent diagonal webs 30 by plates 52 spot welded to the opposite sides thereof.

The end floor beams 34 which are not required to carry any other than the localized floor loads, are of relatively shallow vertical depth, but are of a construction similar to the typical floor beams already described and are connected to the posts in a similar manner. These beams, however, do not extend through the center sill, see Figs. 6 and 11, since it is undesirable to break an opening through the center sill in this heavily reinforced region large enough to admit passage of the floor beams. The ends adjoining the center sill may be connected thereto in the manner shown in Figs. 4 and 5 where a web plate 53 is shown extending between the top and bottom chords of the adjacent sill beam 22 and an outwardly facing channel 54 is welded through its bottom wall to this web plate. The joinder of the end of the vertically shallow floor beam 34 to this channel is effected by having its side walls telescoped over the channel and spot welded thereto. For the attachment of the endmost floor beam 34, elements of the sill structure to be presently described are utilized.

To provide for the attachment of the end sill to the center sill, the usual diagonal webbing between the chords of the sill beams is omitted adjacent the ends of these chords, the web members closest the ends of the sill being extended vertically and consisting of rearwardly facing channels 55 telescoped between the side walls of the top and bottom chords and secured thereto. These rearwardly facing channels are provided with lateral edge flanges in the space between the top and bottom chords 24 and 26. To further reinforce the extended ends of the chords 24 and 26 at the ends of the sills and to provide a socket to receive the end sill, there is provided a heavy gauge channel member 56 extending the whole width of the sill structure and having its top side wall overlapping the laterally extending flanges on the top chords 23, and its bottom side wall overlapping the corresponding flanges of the bottom chords 24 of the sill structure. The vertically extending bottom wall of this channel overlaps the bottom walls of the web channels 55 and is secured thereto just as the side walls are secured to the laterally extending side wall flanges of the top and bottom chords, namely by spot welding. Spacer plates 57, see Fig. 8, of the thickness of the lateral flanges of the chords are provided between the central positions of the reinforcing plates 33 interconnecting said flanges and the side walls of the channel 56.

Figure 6:
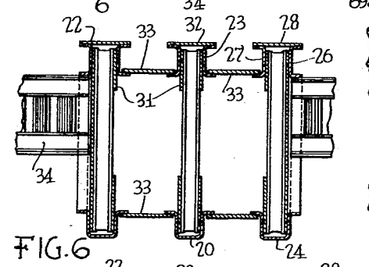
Fig. 6 is a transverse vertical section, the section being taken substantially on the line 6—6 of Fig. 5.

In the assembly of the underframe, the bottom chords 24 of the center sill are first laid down upon the assembly jig in properly spaced relation and the points where the floor beams pass through the center sill are suitably marked thereon, and the preassembled floor beams are laid across the tops of the bottom chords at the appropriate places. Then the web members 30 with or without a gusset reinforcement through which they are secured to the chords, are assembled with the bottom chords in the manner already described. If the floor beams have not already been laid in place, they are now threaded through between the webbing at the appropriate locations. Assuming that the vertically shallow end floor beams 34 have already been assembled with the webbing of the adjacent center sill truss, the sub-assembly will then present the appearance as shown in Fig. 3. The top chords 23 are now brought in place and secured to the webbing, as shown in Figs. 5, 6 and 8, and as already described. The vertically deep transverse floor beams are then positioned between the top and bottom chords of the center sill, but are still unconnected thereto and are free to be transversely and longitudinally shifted in a slight degree as indicated by the dotted line shown in Fig. 3, this freedom being desirable to bring the ends of the beams in the proper assembled relation with the pre-assembled side frame structures. The underframe sub-assembly is thus in a condition, as shown in Fig. 11, to be brought into the final assembly with the side sub-assembly structures. The manner in which this final assembly is effected between the underframe sub-assembly and the side sub-assembly is shown in Figs. 7 and 12 and has already been described in detail.

After the assembly of the underframe sub-assembly to the side frames, the flanges of the top and bottom chords 23 and 24 of the center sill beams and the overlapping flanges on the top and bottom chords 36 and 37 of the floor beams are rigidly secured together thereto by spot welding them in their overlapped areas. Thus the center sill structure is strongly tied into the floor beam structures, and each of the floor beams so joined acts to transmit longitudinal buffing shocks, transmitted to the center sill, into the side frame truss structures.

As shown in Figs. 5 and 6, the inner ends of the sections of the endmost floor beam 34 are connected to the center sill structure through their opposite side walls respectively, to the bottom wall of the channel reinforcing member 56 and the lateral extending flange of the adjacent vertical web member 55.

The underframe structure so far described is completed by spaced longitudinal floor stringers 58 of a height corresponding to the height of top chords 23 of the center sill which also serve as flooring stringers, these stringers being arranged at suitable spaced intervals between the center sill and the side walls. The stringers 58 comprise downwardly facing flanged channel members secured through their edge flanges to the top chords 36 of the transverse floor beams. The attachment of the channels in this downwardly facing relation is highly advantageous since it renders them available for the easy attachment of accessories at any time, even after the body is completed and in service. Additional strength is imparted to these stringers by flat longitudinal strips 59 spot welded to the bottom walls of the channels and projecting beyond the side walls. These laterally projecting portions provide means through which the flooring can be readily secured as by spot welding.

The stringers adjacent the side frame may have the form of laterally facing channels 60, as shown in Fig. 7, the lower side wall of these laterally racing channels being secured to the top chords 36 of the transverse floor beams, the bottom wall overlapping and secured to the inner side walls of the posts and the top side wall supporting the flooring and secured thereto. The flooring comprises corrugated plating 61 laid over the stringers the whole width of the car and secured thereto through the laterally projecting flanges.

After the side frame sub-assemblies, the roof sub-assembly and the underframe sub-assembly have been joined together in the final assembly, all that remains to complete the general box section of the car structure is the bringing in place of the end wall structures. These end wall structures for articulated cars to which this invention is especially adapted, each comprise generally an end sill casting 62 on which may be formed an upwardly and laterally extending end wall truss structure (not shown) connecting the center sill casting to the side wall truss structures. This structure is of course different for the non-articulated ends of the cars.

The articulated end sill casting preferably terminates short of the side walls of the car and is provided, adjacent its ends, with upwardly extending tapered projections 64 through which it is tied into the end wall truss structure. The end sill also carries the outwardly projecting center bearing 65, and since the center bearing is eccentrically arranged with respect to the horizontal transverse axis of the end sill, the end sill must be strongly tied into the center sill construction of the underframe and also into the end wall truss structures to resist the torque due to this eccentric loading.

To tie the end sill 62 strongly into the reinforced endmost portion of the center sill structure, it is provided with a strong central rearward extension 66 of generally I-section, see Fig. 10 4, the rear end terminating in a solid wall 67. This rear extension is telescoped between the reinforced top and bottom chords 23 and 24 of the center sill structure and within the reinforcing channel 56 connected to both top and bottom chords through its top and bottom walls. In this position, the solid rear wall 67 of the extension overlaps the vertical wall of the reinforcing channel 56, and the lateral extensions of the I-beam section thereof overlap the heavy plate reinforcements between the top and bottom chords of the center sill structure. The top and bottom of the extension is strongly secured to this reinforced sill structure which it overlaps by a plurality of rivets 68, see Figs. 4 and 5. The rear wall 67 is likewise strongly connected to the vertical wall of the reinforcing channel 56 as by bolts 69. The rear wall of the channel 56 may be additionally reinforced in this region by flat plates as 69a.

Thus it will be seen that a very strong joinder is had between the center sill structure and the end sill to transmit the buffing shocks and the eccentric loading due to the eccentric arrangement of the bearing 65 to the underframe structure.

Figures 14, 15, 16, 17:
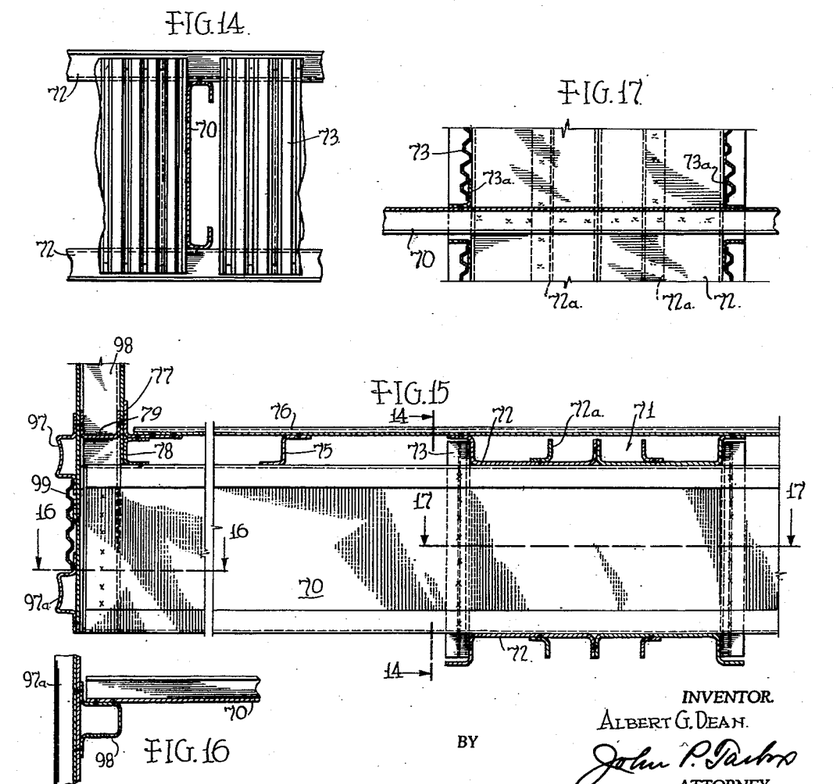
Fig. 14 is a vertical longitudinal cross section through a floor beam and taken on the line 14—14 of Fig. 15.
Fig. 15 is a transverse vertical section taken substantially along the line 15—15 of Fig. 13 and showing the center sill, floor beam and attachment to the side post.
Fig. 16 is a horizontal section taken substantially along the line 16—16 of Fig. 15.
Fig. 17 is a horizontal section taken substantially along the line 17—17 of Fig. 15.

A modified form of construction is shown in Figs. 13 to 20 inclusive and more particularly, the elements are of modified cross sections forming a structure having great strength with fewer parts and welds. The transverse floor beams 70 in this form are of C-shape such as shown in Fig. 14. The vertical depth of these beams is rather great with respect to the width, such beams having an effective plate girder reaction with the deep web completed by the upper and lower flanged or channel chord portions. The floor beams are continuous from side to side of the car body and of a uniform height and are spaced at suitable longitudinal intervals throughout the length of the car body to correspond with the side frame posts as in the prior form.

Intermediate the ends of the floor beams 70, and extending longitudinally throughout the underframe, is a sheet metal box cross section center sill 71 having top and bottom chords 72, which are preferably of channel cross section. In order to use narrower material, two separate channel shaped members are used for each chord, being secured together in the medial plane of the center sill. This central joint makes a straight welded unit possible and gives extra rigidity at the center. The outer edges are laterally and outwardly flanged with the upwardly projecting leg serving as an anchorage for the webs 73 which are preferably of corrugated cross section as shown in Fig. 17. Supplementary angles 72a may be attached to the flat part of the chords 72 to reduce the flat pitch ratio if desired.

The chords 72 are welded to the floor beams 70 which extend through the center sill thus forming a rigid center sill throughout its length and also stabilizing the floor beams. The center sill becomes a highly effective column, adequate to take the major part of the draft and buffing loads, with the bending moment reactions distributed into other body members more readily adapted to resist them. In addition, the corrugated webbing 73 is also attached to the floor beams by means of angles 73a and this adds to the columnar strength of the center sill.

Longitudinal stringers 75, preferably of Z-shape are secured to the tops of the floor beams 70 as by welding, such stringers being transversely spaced and rigidly holding the floor beams adjacent the ends. Certain of the stringers 75 on each side are not welded to the floor beams until after assembly of the side frames, however, as the integral connection of the ends of the floor beams to the side frame posts requires some flexibility. The stringers aid materially in establishing rigidity of the floor beams and this is further improved by the transversely corrugated flooring 76 which is in turn welded to the stringers so that the entire underframe, as in the form first described, acts as a plate girder.

As shown in Fig. 15, a longitudinally extending angular member comprised in this instance of an angle 77 and a channel 78, serves as a side edge support of the flooring or floor sheeting 76 and as an anchorage or joint between the floor sheeting and the transverse floor beams 70 of the underframe and the posts 98 of the side frame sub-assembly. This angular member is secured by a vertical arm of the angle 77 to the inner faces of the posts and by horizontal arms, through the one formed by the overlap of the horizontal arm of angle 77 and the top side wall of channel 78 to the floor sheeting, and through the arm formed by the bottom side wall of the channel 78 to the transverse floor beams 70. Finally, this longitudinally extending angular member is secured between the posts to the outer sheathing of the side frame sub-assembly by an angular section bridging member as represented by the channel 79 which is disposed vertically adjacent the floor level and has its side walls secured respectively to the vertical arm of the angle 77 and to the outer sheathing of the side wall, constituted at this point by the moulding 97. The web of this channel is disposed substantially in the plane of the floor sheeting. This arrangement of parts provides a very strong, readily assembled as by spot welding, final assembly joint structure between the side wall and underframe sub-assembly.

Figure 18:
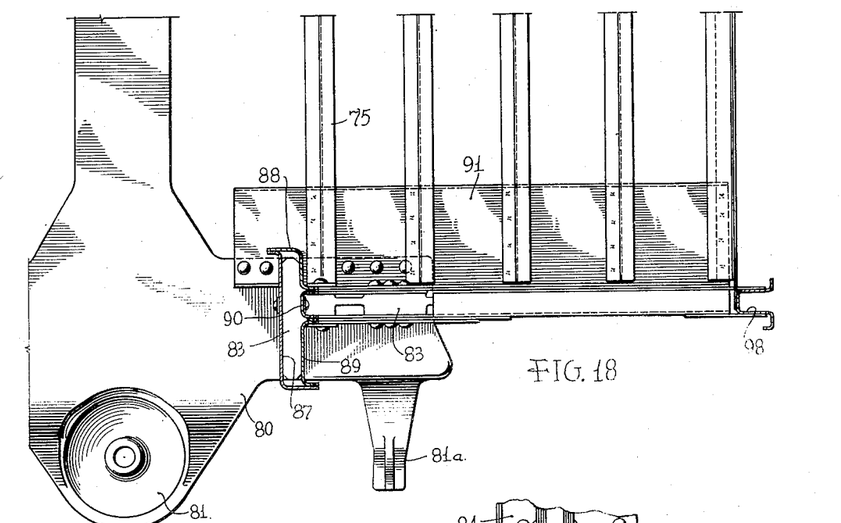
Fig. 18 is a plan view with parts in section of the end sill and related members.
Figure 19:
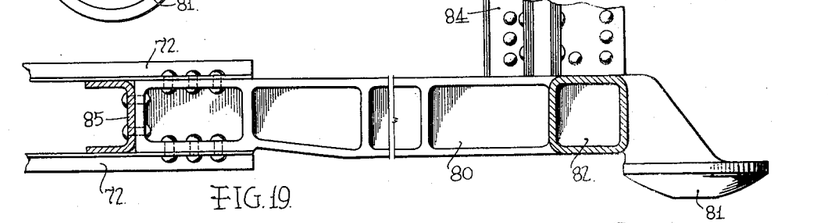
Fig. 19 is an elevation of the end sill shown in Fig. 18.

The underframe is completed with an end sill member 80, which is shown as of the articulated type, having the outwardly projecting center bearing 81 and side bearings 81a. Integral with the top of the member are the projections 83 which serve for the anchorage of anti-collision posts 84. As shown in Fig. 18, the principal parts of the posts 84 which are formed into box cross section members are the Z members 87, the secondary Z members 88, and the two channels 89 and 90.

The end sill member 80 has a substantial inward extension through which it is secured to the center sill chords 82 by rivets or other means. At approximately the junction of the center sill and end sill member 80 is provided a transverse needle beam member 85 which has enlarged flanges 85a at its extremities for attachment and general distribution of loads to the side frames. The end sill member has a closed web 82 at approximately the transverse horizontal axis of bending due to the eccentric load reactions on the bearing 81.

The end sill member 80 preferably does not extend to the side frames but is joined thereto by the plate-like member 91 which is preferably of a Z cross section with the wide web between the arms of the Z adapted to receive the Z stringers 75. The plate-like member 91 is rigid in a horizontal plane but is not torsionally stiff.

Between the end sill members 80 and the needle beams 85, a horizontal shear panel is preferably provided by using a double thick flooring or similar additional plate material as diagrammatically illustrated at 102. Such shear panel is not necessary, however, in the region between the needle beams 85 which has the usual flooring 76 heretofore mentioned.

With an articulated car the load reactions on the end sill member 80 include a torque reaction due to the eccentric position of the bearing 81 and a horizontal reaction due to draft and buffing. The draft and buffing loads also have a torque reaction and safety requirements make it essential that the anti-collision beam 84 be adapted to resist a substantial longitudinal load depending upon the weight of the vehicle body. The loads are distributed in this construction into the roof and side frames by means of the longitudinally deep anti-collision beam 84 and also into the side frames through the needle beam 85. The center sill is primarily a column, however, and is not adapted to resist any material amount of bending so that its weight may be kept at a minimum. The shear plate 102, however, is adapted to materially resist the couple reaction of torque on the end sill member and is also adapted to distribute the horizontal loads throughout the stringers and flooring so that the entire underframe will resist these high loads. The end frame truss also distributes certain of the loads into the side frames and with the relatively flexible plate 91 permitting a proportional deflection of parts, an effective stressing of the underframe and side frames is possible. It is to be noted that the relatively long extension of the end sill member 80 makes it possible to attach the end sill to the center sill at a point of low bending moment.

The manner of attachment of the underframe to the side frames is substantially the same as in the prior form of embodiment of the invention in that the underframe is substantially completed and the side frames brought into position with the posts 98 of the side frame overlapping the webs of the floor beams 70, as shown in Fig. 16, after which the overlapping web areas are welded together. As shown in Fig. 15, the lower chord structure of the side frames, which are preferably truss structures, includes the mouldings 97 and 97a which are initially attached to the posts 98 as by welding with the intermediate space between the mouldings 97 and 97a covered as by a corrugated paneling 99. The paneling 99 is applied after the posts are welded to the floor beams so that the welding is entirely accessible.

Figure 20:
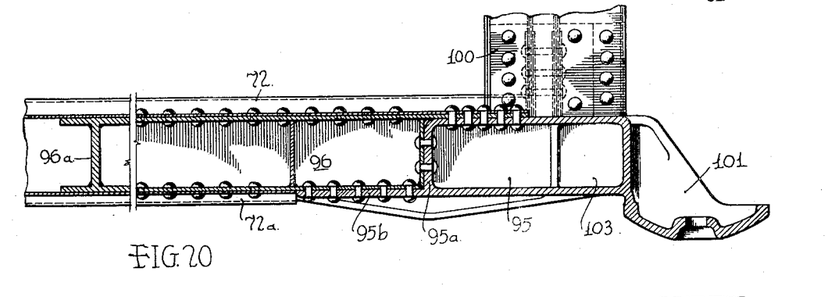
Fig. 20 is an elevation of a modified form of end sill.

A modified form of construction of end sill is shown in Fig. 20, the end sill being indicated at 95 and being of relatively short, stubby proportions having stepped flanges 95a and 95b which cooperate with central outward extension 96 of the needle beam. In this case, the needle beam is of substantially T-shape with the laterally extending branches constituted by I-beams generally indicated at 96a, such lateral extensions being secured to the side frames as in the prior construction.

The needle beam extension 96 is permanently attached to the center sill, the upper chord 72 of which extends to the end sill member. The lower chord 72a, however, is of less extent so that the end sill 95 may be removed from the needle beam extension and underframe in case of damage. As in the prior construction, the bearing is represented at 101 and the vertical web 103 gives the maximum strength to the effective box cross section at the horizontal transverse axis about which the torque reactions take place.

The shear panel 102 which is suitably used between the end sills and the needle beams, might also be effectively used in the same relative position on a non-articulated car in which the bolster would have the same relative position with respect to the end sill as does the needle beam. The overhang in such case sets up a considerable eccentric load which can be readily reacted by the shear panel.

It will thus be seen that the objectives of my invention are obtained by a lighter weight, higher strength structure in which most of the parts are stressed to an efficient degree so that full advantage of their weight can be obtained. It is also to be noted that although welding of "stainless" steel is believed to be the most effective manner of integrating the structure, other materials and other securing means might be used.

While I have shown preferred forms of embodiment of my invention, I am aware that other modifications may be made thereto and I, therefore, desire a broad interpretation of my invention within the scope and spirit of the disclosure herein and of the claims appended hereinafter.

What I claim is:

1. An underframe for vehicle bodies which comprises a plurality of transverse floor beams of deep C-shape providing a deep vertical web portion and top and bottom chord portions of channel section, and a hollow box section center sill through which said floor beams extend, said floor beams being attached to said center sill through the chord and web portions thereof.

2. An underframe for a vehicle body having a center sill with top and bottom chords interconnected by webs, a plurality of floor beams extending through the center sill and between the chords and directly attached to the chords, and webbing between the floor beams and attached to the floor beams and to the chords, said floor beams being of C-shape, the top and bottom flanges of which act as chords, the web being deep and constituting an effective transverse plate girder, said latter web being also secured to the webbing of said center sill.

3. An underframe for vehicle bodies which comprises a plurality of transverse floor beams of deep C-shape, a hollow box section center sill through which said floor beams extend, said floor beams being attached to said center sill, said center sill including channel shape chord members and transverse webbing secured to said chord member between said floor beams, and secured also to said floor beams to mutually stabilize them.

4. An underframe for vehicle bodies comprising spaced transverse floor beams having laterally extending flanges at the tops thereof and having at their ends final assembly joint extensions for securement to posts of the vehicle body side walls, closely spaced longitudinally extending metal floor stringers of angular cross section having lateral flanges resting on the lateral flanges of the floor beams, means to secure the stringers to the floor beam flanges, a transversely corrugated metal flooring on said stringers, and means to secure the flooring to the stringers, the stringers at the side margins of the underframe including an upstanding flange arranged to overlap and be secured in the final assembly to the posts of the vehicle body side walls.

5. An underframe for vehicle bodies comprising spaced transverse floor beams having laterally extending flanges at the tops thereof and having at their ends final assembly joint extensions for securement to posts of the vehicle body side walls, closely spaced longitudinally extending floor stringers of angular cross section having an intermediate web and laterally projecting members extending from each edge thereof, one of said members being secured to the lateral flanges of the floor beams, the other member providing means for attaching a flooring and transversely corrugated flooring secured to said last-named member, the stringers at the side margins of the underframe including an upstanding flange arranged to overlap and be secured in the final assembly to the posts of the vehicle body side walls.

6. An underframe for vehicle bodies comprising a center sill structure having top and bottom chords and webbing interconnecting the chords, transverse floor beams threaded through openings in the webbing and between the top and bottom chords and secured to the top and bottom chords of the center sill structure, longitudinally extending floor stringers of downwardly presenting channel section and having laterally extending flanges from the side wall thereof secured to said transverse floor beams through said lateral flanges, and flat plate reinforcements welded to the bottom walls of the channels of said stringers and extending laterally therebeyond to provide means for attaching the floor plating.

7. An underframe for a vehicle body comprising a longitudinal center sill, transverse floor beams extending therethrough, and a needle beam adjacent the ends of said center sill having a central extension toward the end of the body, said extension having an outwardly and downwardly stepped portion to form a seat for securing an end sill whereby said end sill may be applied and removed from the body.

8. An underframe for vehicle bodies comprising a center sill structure consisting of spaced vertically deep trussed beams having top and bottom chords provided with laterally extending flanges, transverse floor beams threaded through the spaces between the top and bottom chords of said center sill beams and secured to said laterally extending flanges, the center sill beams being reinforced for some distance inwardly of the ends thereof by plates having their side edges overlapping the laterally extending flanges of the chords of the sill beams and secured thereto.

9. An underframe for a vehicle body comprising a central buffer sill built up of a pair of spaced vertically deep trussed beams extending throughout the length of the underframe, the ends of said center sill being reinforced for a substantial distance by a third vertically deep trussed beam and by means bridging the space between the chords of said beams and securing them together.

10. An underframe for an articulated train body comprising a center sill having its end portions built up of a multiple number of vertically deep trussed beams, said trussed beams having top and bottom chords provided with laterally extending flanges, reinforcing plates bridging said flanges and interconnecting the beams transversely, an end sill carrying side and center bearings projecting beyond the main body thereof, said end sill being provided with an inward extension telescoped between the top and bottom chords of the center sill and secured thereto through the reinforcing plates connecting the chords of the vertical beams forming parts of said sill structure.

11. An underframe for a vehicle body comprising a center sill built up of a multiple number of closely spaced vertically deep trussed beams, the chords of such beams being laterally flanged and secured together a substantial distance from their ends by reinforcing plates bridging the flanges of adjacent chords and secured thereto, the webbing adjacent the ends of said beams being omitted, a heavy reinforcing plate of outwardly presenting channel section being telescoped between the top and bottom chords at their ends and secured thereto through their laterally extending flanges, an end sill having eccentric bearings and an inward extension telescoped within said channel section reinforcement and secured to the side walls thereof and to the reinforcing plates extending between the chords by one set of securing means and to the bottom wall of said reinforcing channel by another set of securing means.

12. An underframe for vehicle bodies comprising a center sill structure including closely spaced beams of truss form, said beams having lower chords of upwardly facing flanged channels and upper chords built up of laterally facing channels having their top side walls interconnected by a bridging plate forming with the laterally facing channels an upper chord of generally downwardly presenting channel form, the chords being interconnected by diagonal webbing of the Warren truss type telescoped within the channels of the chords and secured to the side walls thereof, transverse floor beams threaded through the webbing and between the chords and connected at top and bottom respectively to the laterally extending flanges of the top and bottom chords of the center sill trusses.

13. A vehicle body construction comprising side wall trusses, an underframe including a center sill structure having top and bottom chords and comprising closely spaced trussed beams and transverse floor beams threaded through the center sill beams and secured to the top and bottom chords thereof, the floor beams arranged some distance inwardly of the ends of the vehicle body being of considerably heavier construction than the remaining floor beams and adapted to transmit buffer shocks from the center sill structure into the trussed side wall structures, the ends of said center sill structure beyond said reinforced transverse floor beams being heavily reinforced and adapted to transmit substantially all the buffer shocks into said reinforced transverse beams and the entire vehicle body structure inwardly of said beams.

14. In a vehicle body of the class described, a final assembly joint between the side frames and the underframe in which the underframe includes floor beams having a relatively deep web and integral chord portions at top and bottom of said web constituting channel section chords, and the side frames have posts with web portions, the webs of the floor beams extending into overlapping relation with the webs of the posts and being secured thereto by welding.

15. A vehicle body construction comprising a vertical post of laterally facing channel section having wide flat side walls, and a transverse floor beam of vertically deep section secured to said post, the floor beam being a box section beam having its side walls integrally extended to overlap to a substantial degree the opposite side walls of the post and spot welded thereto throughout said overlapped area, whereby the posts and floor beams are strongly joined together without the use of gussets or the like.

16. A vehicle body construction having side walls of truss form including spaced posts of laterally facing channel section having wide flat side walls, an underframe including correspondingly spaced floor beams of box section and of a vertical depth many times their width, the side walls of said box section floor beam being integrally extended to overlap the side walls of a post to a substantial degree and secured thereto throughout said overlap, whereby the posts and floor beams are strongly joined together without the use of gussets or the like.

17. A vehicle body construction including a vertical post and a vertically deep floor beam connected to the bottom of said post, said post being of outwardly facing channel section, and said floor beam comprising top and bottom chords of generally channel section interconnected by spaced corrugated web plates, the side walls of said chords and the webbing interconnecting them being extended to overlap the side walls of the post, the extended portion of the webbing being of flat form, the post and floor beam being connected by spot welds throughout substantially their entire overlapping area.

18. A vehicle body of the class described comprising side wall sub-assemblies including posts and outer sheathing applied to the posts, and an underframe comprising transverse beams and floor sheeting secured thereto, said floor beams having their ends directly overlapping the posts and secured thereto, a longitudinally extending angular member secured to said flooring and having a vertically extending portion overlapping and secured to said posts, and a longitudinally extending bridging member of angular section between posts, disposed vertically adjacent the floor level and secured through one arm to said vertically extending portion and through another arm to said outer sheathing.

19. A vehicle body according to claim 18 in which the flooring is secured to the transverse members by interposed longitudinally extending stringers and the longitudinally extending angular member has horizontal portions thereof secured to said floor sheeting and said transverse beams.

20. A vehicle body according to claim 18 in which the outer sheathing and the floor sheeting are corrugated.

21. A vehicle body according to claim 18 in which the outer sheathing is longitudinally corrugated and the floor sheeting is transversely corrugated.

22. A vehicle body according to claim 18 in which the floor sheeting is transversely corrugated and secured to the transverse beams through interposed longitudinally extending angular section stringers.

23. A vehicle body according to claim 18 in which the floor sheeting is transversely corrugated and secured to the transverse beams through interposed longitudinally extending angular stringers and in which the extreme laterally located such stringer comprises the longitudinally extending angular member having vertical and horizontal portions interconnecting the floor sheeting, transverse beams, bridging member and posts.

24. A vehicle body according to claim 18 in which the web of the bridging member extending between the outer sheathing and the vertically extending portion of the longitudinally extending angular member is substantially in horizontal alignment with the floor sheeting.

25. A vehicle body according to claim 18 in which all the parts are joined by spot welding and the welds are principally subject only to shear stresses.

26. A vehicle body according to claim 18 in which each, the longitudinally extending angular member and the bridging member, has a vertically extending portion, the longitudinally extending angular member forming part of the floor sub-assembly and the bridging member forming part of the side wall sub-assembly, the adjacent vertically extending portions of these members overlapping and being joined together in final assembly.

27. A vehicle body according to claim 18 in which each, the longitudinally extending angular member and the bridging member, has a vertically extending portion, the longitudinally extending angular member and the transverse beams forming parts of the floor sub-assembly and the bridging member and the uprights forming parts of the side wall sub-assembly, the transverse beams and uprights on the one hand, and the adjacent vertically extending portions of the longitudinal angular and bridging members, on the other hand, overlapping and being joined together in final assembly.

ALBERT G. DEAN.